Dec. 18, 1962

G. EVEN 3,068,757

ARMORED TANK PROVIDING PRESSURIZED CIRCULATION OF VENTILATING AIR

Filed March 18, 1958

Inventor
G. Even
*[signature] Attys.*

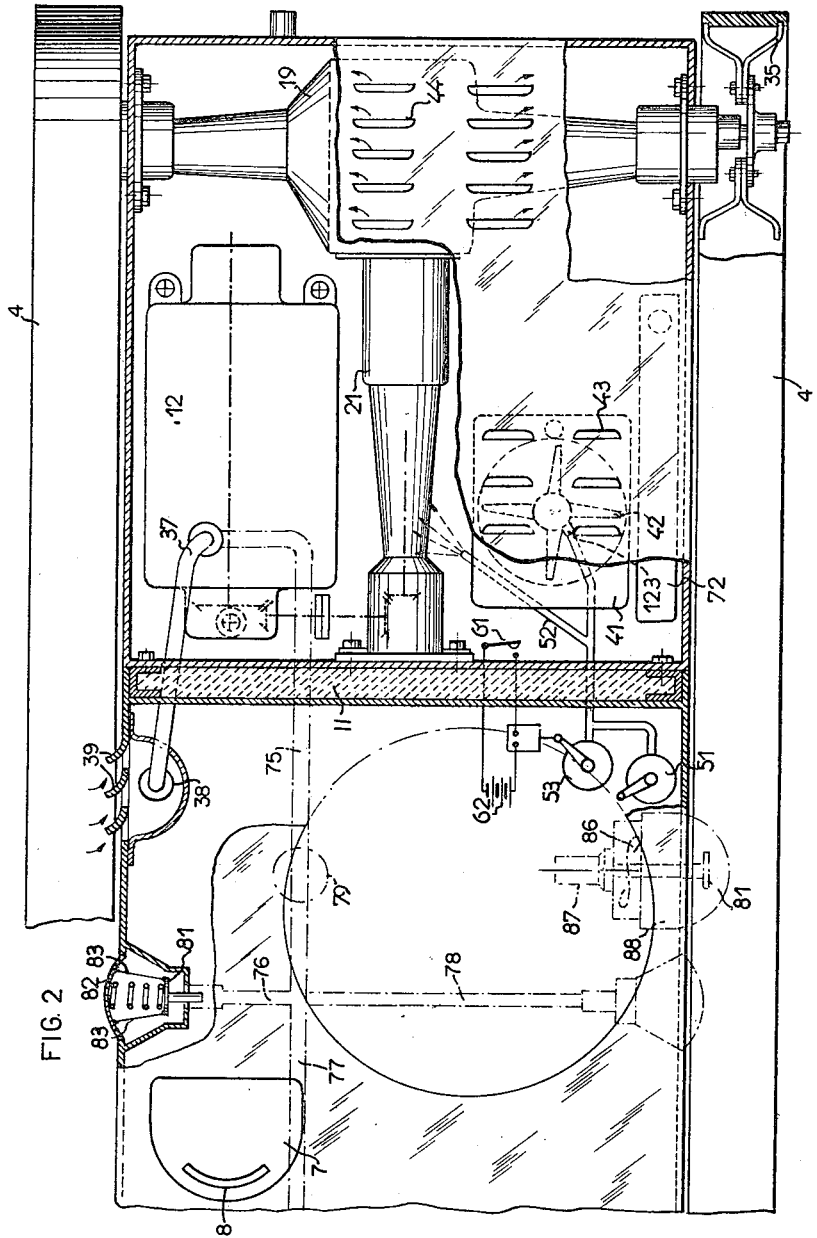

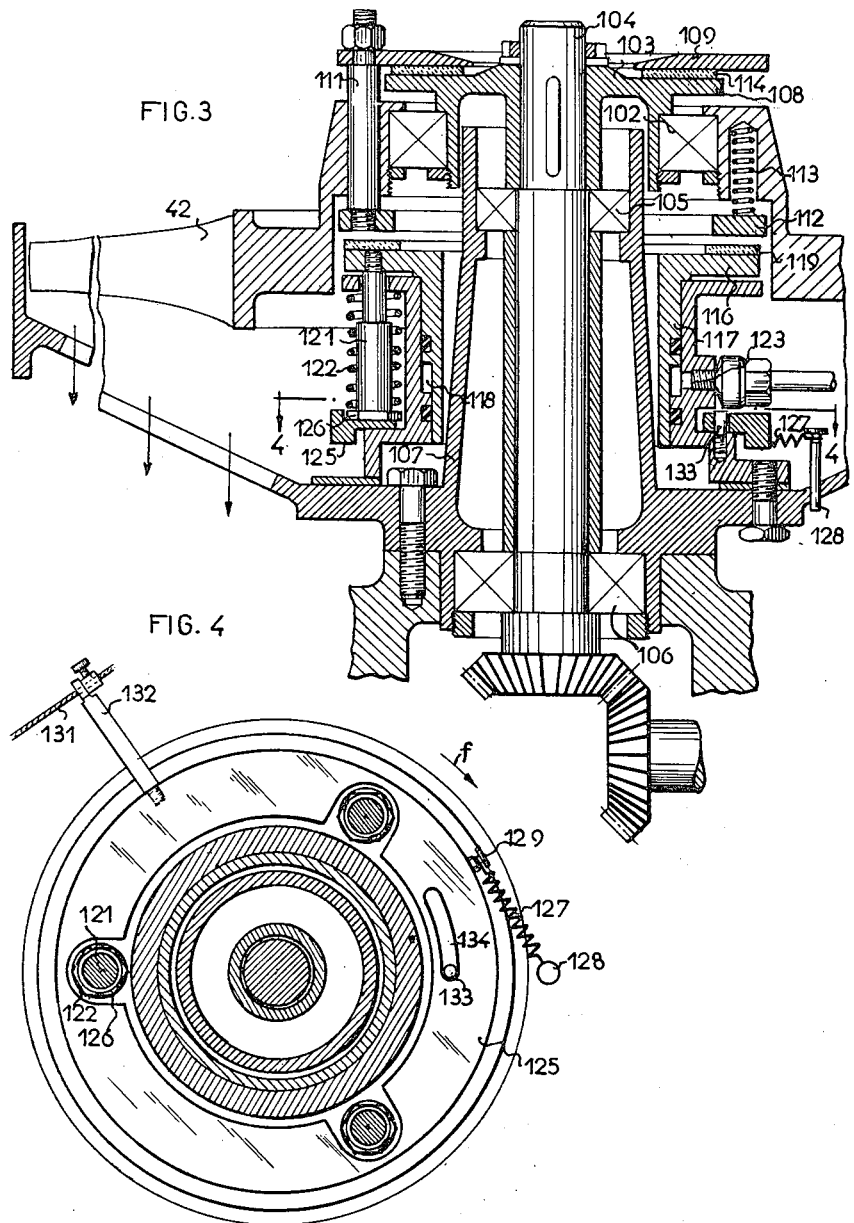

United States Patent Office 3,068,757
Patented Dec. 18, 1962

3,068,757
ARMORED TANK PROVIDING PRESSURIZED
CIRCULATION OF VENTILATING AIR
Georges Even, 3 Blvd. Victor, Paris 15, France
Filed Mar. 18, 1958, Ser. No. 722,192
Claims priority, application France Mar. 21, 1957
5 Claims. (Cl. 89—36)

The present invention relates to armoured vehicles.

It is well known that in armoured vehicles there are three distinct causes of air consumption, namely, breathing of the passengers, ventilation for cooling the engine and the supply of combustive air to the engine. Up to now, the amount of air necessary for at least the two former above functions is taken from one common compartment constituted by the inner space of the vehicle. Such a disposition, however, has series drawbacks.

Actually, the passengers are exposed to the oil and petrol vapours and in case the petrol tank happens to leak, the petrol spreads over in the vehicle and is therefore likely to set it on fire. Furthermore, the air used for cooling the engine being sucked from the inside of the vehicle, the pressure prevailing in the latter is lower than the atmospheric pressure. This results in air being introduced directly from outside into the vehicle. In cold weather, the passengers are very uncomfortable and, furthermore, since these vehicles are not airtight, even though air is sucked from outside through a filter, it is impossible to prevent air, loaded with more or less noxious foreign matters (for instance, fighting gases or radioactive dust) from entering into the vehicle through the numerous gaps in the walls of the vehicle.

Moreover, and this is still more serious, if a bottle containing burning petrol or any volatile product is thrown on the vehicle near the air inlets, the air sucked by the cooling system blows the flames along into the vehicle and keeps them burning. The passengers, therefore, must immediately leave the vehicle, or operate their fire extinguishers and, in the latter case, the atmosphere in the vehicle soon becomes choking, so that they must leave the vehicle anyway.

The aim of the invention is to remove the aforesaid drawbacks.

To this effect, according to the invention, the three functions of air supply for breathing, cooling the engine, and feeding the engine, are made independent from one another.

For this purpose, the vehicle is divided into two compartments separated from each other by an airtight wall. One of said compartments is intended for the passengers and the other encloses at least the ventilation system for cooling the engine. Due to this arrangement, the passengers breath an atmosphere which is entirely independent from the atmosphere contained in the compartment where the ventilation system for cooling the engine is arranged. If a fire breaks out in the ventilation compartment, the passengers therefore are able to go on living in the compartment.

An automatic or manual device makes it possible to stop the ventilation of the engine, for instance by obturating the air inlet or by stopping the rotation of the cooling fan so as not to feed the flames any longer with oxygen; then the fire may be put out by the action of manually or automatically operable fire extinguishers.

As a rule, the engine will also be set in the ventilation compartment. If it is an air cooled engine this condition is compulsory of course, but if it is a water cooled engine, it is possible to have the engine and further mechanisms, if need be, set in the passengers' compartment, while a cooling radiator with its fan and, if need be, also the radiator for cooling the speed box and differential, are then arranged in the ventilation compartment.

For the sake of safety, it will be advantageous to place the petrol tank in the ventilation compartment, and the ammunition, in the passengers' compartment.

According to another feature of the invention, the combustive air is fed to the engine through a pipe which opens directly in the atmosphere outside the vehicle and which has no communication whatever with any of both aforesaid compartments. In this manner, there is no risk that flames happening to enter this pipe could spread in these compartments.

In order to minimize the risks of the motor being choked the combustive air supply pipe may be connected to a plurality of branches which open outside the vehicle at places positioned away from one another, for instance in front of and on each side of the vehicle. At least one of said orifices may be positioned at a protected location, for instance under the vehicle, or under the caterpillar protecting hood.

In one embodiment, each of these orifices is equipped with a device which is capable of obturating it should it be surrounded by flames. Due to this disposition, the engine may still be supplied with combustive air through the other orifices.

It is possible to have the pressure in the passengers' compartment somewhat greater than the atmospheric pressure, so that it is possible to force therein filtered air and the gaps in the wall of the passengers' compartment may only let some quantities of air escape and not allow noxious air to enter said passengers' compartment. It is also possible to introduce into the passengers' compartment hot air taken from the ventilation compartment and thus prevent cold air to enter directly the passengers' compartment which thus becomes less uncomfortable. Furthermore, it is advantageous to make the partitions between both compartments of the vehicle fireproof and preferably soundproof.

It is clear that the features according to the invention make it possible not only to isolate the passengers of an armoured vehicle in order to protect them against fire outbreaks, but also for these passengers to rule a fire outbreak and therefore to be able to further master the vehicle from the point of view of propulsion as well as from the point of view of shooting whereas the conventional armoured vehicles are particularly liable to be rapidly immobilized or destroyed by fire.

According to a further feature of the invention, both compartments of the vehicle are constituted by two distinct assemblies secured to each other by means of removable members so that a compartment enclosing propulsion members out of condition may be readily replaced by another which encloses propulsion members ready for use. Maintenance of the vehicle therefore may be carried out in a very short time; this considerably reduces the time during which the vehicle is usually immobilized for repair of that kind.

The invention will be better understood from the following detailed description, together with the accompanying drawings submitted for purpose of illustration only and not intended to limit the scope of the invention, reference being had for that purpose to the sub-joined claims.

In these drawings:

FIG. 2 is a corresponding top view, also with portions broken away.

FIG. 3 is on a larger scale an axial section of the fan and the declutching and braking device therefor, and FIG. 4 is a sectional view made on line 4—4 of FIG. 3.

Figure 1:
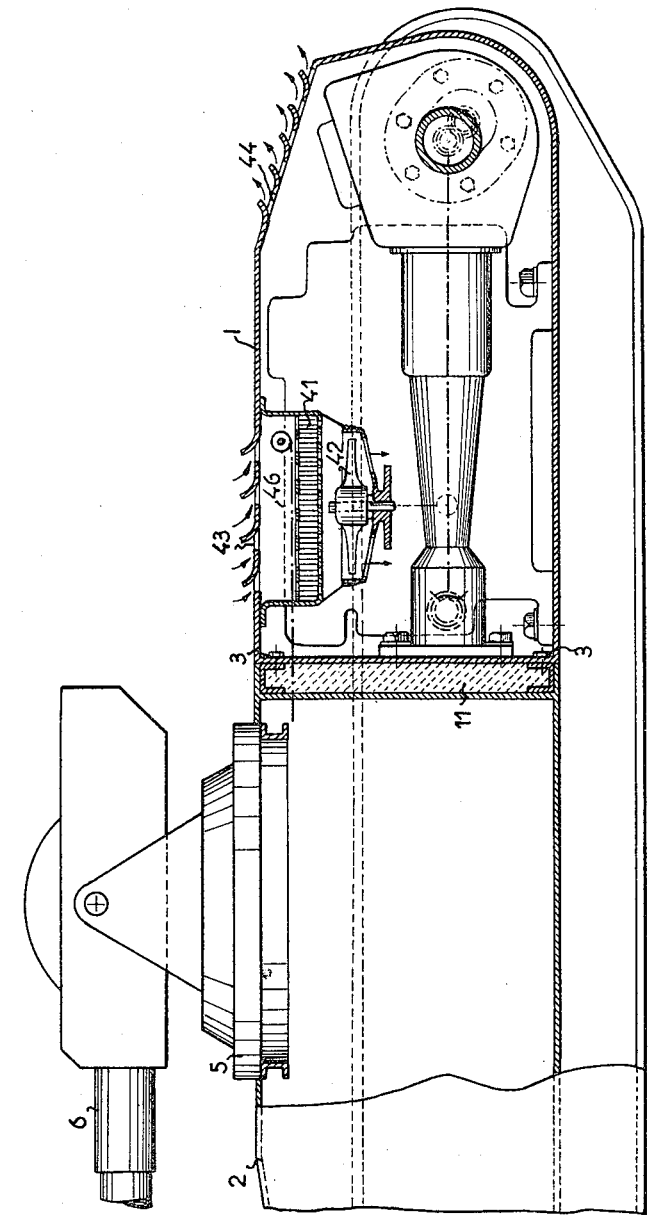
FIG. 1 is a fragmentary elevational side view of an armoured vehicle according to the invention, with some portions broken away.

The body of the armoured vehicle shown in FIGS. 1 and 2 is made of two parts, namely, a rear part 1 which forms a so-called "ventilation compartment" adapted to enclose the members necessary for propelling the vehicle, and a fore part 2 which forms a second so-called "passengers' compartment" adapted to receive the passengers and the ammunition. In the embodiment shown these compartments are secured to each other in a manner such as to be dismountable, by means of any suitable conventional means such as the bolts 3. The vehicle is propelled by means of two conventional caterpillars 4 carried by two power wheels 35 driven by an engine 12 (which in this embodiment is a water cooled engine) through any conventional suitable transmission incorporating a speed box 21 and a rear axle 19.

No comments will be given about the details of the fore part of the vehicle, which are not concerned with the invention. The drawing merely shows the turret 5 which supports a gun 6 operated by a man sitting within said turret and a rotary cover 7 provided with a viewing device 8 for a second man who drives the vehicle.

The two aforesaid compartments of the vehicle are separated from each other by an airtight and fireproof wall 11 so that in case of a fire outbreak within the ventilation compartment, the atmosphere within the passengers' compartment does not become noxious nor exceedingly hot.

The engine 12 is supplied with combustive air through a pipe 37 which tightly extends through the passengers' compartment where it is fitted with a filter 38. This filter may thus be changed without it being necessary to reach within the ventilation compartment and, therefore, without it being necessary to leave the passengers' compartment. The entrance to the filter 38 communicates with the exterior of the vehicle through the louvres 39.

The radiator intended to cool the water of the cooling system of the engine is indicated at 41 and the air which cools said radiator is sucked in by a fan 42 arranged in the ventilation compartment close to the louvres 43 cut through the upper wall of the ventilation compartment and it is discharged through said compartment from which it escapes through the louvres 44 cut in the rear portion of said compartment. The result is that the pressure prevailing in the ventilation compartment is higher than the atmospheric pressure. The fan 42 is driven for instance by the engine 12 through any suitable transmission.

It will be noted that the radiator 41 is arranged immediately below the air inlets 43, which has two advantages. Actually, the radiator serves as a flame protector since it tends to prevent the flames from entering the ventilation compartment and, furthermore, in case flames happen to penetrate into said compartment, through the radiator, the latter is located at the root of the flames, i.e., at a place where the temperature is relatively low, the higher temperature in a flame always being located near the tip thereof, as it is well known or, at least, at some distance from the root.

In order to avoid an increase of oxygen into the ventilation compartment in case of a fire outbreak in said compartment, means have been provided for stopping the ventilation of the engine and its accessories. In the embodiment represented in FIGS. 1 and 2, such means consist in a movable screen 46 which may be actuated from the passengers' compartment in order to obturate the air inlets 43. If it is so desired, similar means may also be provided for obturating the air outlets 44.

The petrol tank is indicated at 72 and the equipment of the vehicle is completed as usual without it being necessary to describe it. In order to extinguish a fire outbreak within the ventilation compartment, fire extinguishers 51 and 53 are connected to a pipe 52 which opens into said ventilation compartment. At least, the fire extinguisher 51 which is manually operable is arranged within the passengers' compartment. The fire extinguisher 53 is automatically released by a thermal element 61 electrically connected to a source of current, such as the accumulator 62 and which is responsive to the temperature prevailing within the ventilation compartment in such a manner that upon said temperature exceeding a permissible value, said thermal element trips and the extinguishing fluid is discharged from the extinguisher 53 into the whole ventilation compartment.

A flame happening to penetrate into the ventilation compartment and maintained therein only during a very short length of time, for instance of the order of 5 to 6 seconds, would have no detrimental effect upon the various members enclosed within the said compartment. This is why in one embodiment said thermal element 61 possesses sufficient thermal inertia, or is provided with a timing device in such a manner that the fire extinguishers be actuated only a few seconds after a fire breaks out within the ventilation compartment. The volume of air contained in the ventilation compartment is, further, very small because this compartment is practically full of mechanical members.

It is clear that the construction according to the invention makes it possible not only to isolate the passengers of an armoured vehicle in order to protect them against fire outbreaks, but also for these passengers to rule a fire outbreak and therefore to be able to master the vehicle from the point of view of propulsion as well as from the point of view of shooting, whereas the conventional armoured vehicles are particularly liable to be rapidly immobilized or destroyed by fire.

The engine may be fed with combustive air also through a pipe 75 fed with a filter 79 and several branches 76, 77, 78 which open to the outside through orifices located away from one another and each provided with a manually or automatically operable obturating device which makes it possible to obturate the corresponding branch should said orifice be surrounded with flames, so that the supply could be going on through the other branches. By way of example, a valve 81 urged to closed position by a spring 82 is adapted to obturate the only orifice of the pipe 76. During normal running the valve 81 is held open by combustion strings 83. Upon said orifices being subjected to excessive heat the strings 83 burn out and the spring 82 closes the valve. Each air supply orifice is provided wtih a similar automatic obturating device.

The passengers' compartment is supplied with fresh air directly from the outside by means of a fan 86 actuated, for instance by an electric motor 87 and mounted in an opening through the wall of this compartment into which it will discharge air under a slight overpressure, the air being sucked through a filter 88. Here again, a device could be provided for obturating the air inlet, said device being either manually or automatically actuated and, for instance of the type of the device 81—83 hereinabove described.

Of course, it is desirable that the ammunition also be placed within the passengers' compartment which is protected against fire outbreaks.

By way of modification, instead of providing a movable screen for obturating the air inlets for the cooling air, in order to stop the ventilation of the engine and its accessories, a device could be provided for stopping the fan. Such a device is represented in FIGS. 3 and 4 and comprises both a clutching and a braking device.

The fan 42 is rigid with the outer race of a ball bearing 102, the inner race of which is rigid with a hub 103 secured to a driving shaft 104 which is journalled into ball bearings 105 and 106 mounted in a stationary support 107.

The clutching device which connects the blades of fan 42 to its driving shaft 104 comprises a plate 108 rigid with the hub 103 and an annular power take-off plate 109 which is connected to the blades of fan 42 by fingers 111

(three in number in this embodiment) mounted for axial sliding movement with respect to said fan. The free end portions of the fingers 111 are connected to one another by an annular braking plate 112. Three springs 113 inserted between the fan body and the braking plate 112 urge the power take-off plate 109 toward the plate 108. An annular disc 114 made of a material having a high friction coefficient is inserted between these two plates.

The device for braking the fan already comprises the braking plate 112 rotatably rigid with the fan, then another annular plate 116 rigid with a piston 117 adapted to be reciprocated in a cylinder 118 rigid with the body 107. A further annular disc made of a material having a high coefficient of friction 119, is inserted between the plates 112 and 116. Fingers 121 (also three in number in this embodiment) rigid with the plate 116 are adapted to slide axially through holes in the flange of cylinder 118. Three springs 122, threaded respectively over the fingers 121 bear against the aforesaid flange and a head formed at the free end of said fingers in order to urge both plates 112 and 116 away from each other.

A pipe union 123 mounted on the cylinder 118 serves for introducing a pressure fluid into said cylinder in order to actuate the piston 117. In the embodiment represented, the union 123 is connected to the pipe 52 leading from the extinguishers 51, 53.

The whole arrangement is such that at rest the springs 122 hold the plate 116 away from the braking plate 112 (brake released), whereas the springs 113 hold the power take-off plate 109 in engagement with the plate 108 (clutch engaged) and that the pressure fluid forced into the cylinder 118 moves the plate 116 against the action of the springs 122, towards the braking plate 112 (brake on) and that, in its turn, the braking plate 112 which is rigid with the power take-off plate 109 moves the latter away from the plate 108 (clutch disengaged) against the action of the springs 113.

A device for locking the piston 117 in the position corresponding to the brake being on, comprises a ring member 125 centered on the cylinder 118 and adapted to be moved angularly in its own plane coaxially with respect to said cylinder. The ring member 125 has three recesses 126 of a width large enough for receiving the free end portions of the fingers 121. A spring 127, one end of which is attached to a pin 128, rigid with a support 107, and the other end to a radial pin 129, rigid with said ring member 125, urges the latter in the direction of the arrow ƒ (FIG. 4). A manually operable device comprising a cable 131 attached to a radial arm 132 rigid with the ring member 125 serves for pivoting the latter in the direction opposite to that of the arrow against the action of the spring 127. A stop 133 rigid with the support 107 and movable in an arcuate slot 134 cut in the ring member 125 serves as an angular stroke limit abutment for said ring member in both directions.

The whole arrangement is such that the ring member 125 is positioned at the end of its angular stroke in which it has been taken by the spring 127, its recesses 126 are positioned out of reach of the fingers 121, whereas when it is positioned, subsequent to the tractive action exerted by the control cable 131, at the opposite end of its angular stroke, said recesses are precisely positioned in register with the fingers 121.

The operation is as follows:

With the device as represented in the drawings, the shaft 104 rotatably drives the fan through the clutch 108, 109 now engaged under the action of the springs 113, the brake 112—116 being released. The fingers 121 bear against the bottom of the recesses of the ring member 125 and prevent the latter from pivoting under the action of the spring 127.

Upon pressure fluid being forced into the cylinder 118, particularly upon the fire extinguishers being tripped, the piston 117 is shifted and provides for making the brakes 116, 112 effective and disengaging the clutch plates 108, 109. The fan is suddenly stopped. Meanwhile, the ring member 125 is moved angularly so that even though the fluid pressure is dropped in the cylinder 118, the fingers 121 under the action of the springs 122 are held in bearing engagement against said ring member outside the recesses and are unable to recede; the braking, therefore, is held clamped and the clutch disengaged until a tractive effort is exerted upon the control cable 131 in order to bring the locking ring back into its inactive position in which the fingers again fall into the bottom of the recesses and enable the springs to provide for clutching on the fan and releasing the brake.

It will be noted that, if it is desired to stop the ventilation without emptying the fire extinguishers, especially during a short time, it is sufficient to make the manually operable fire extinguisher 51 effective during one moment only in order to actuate the device for braking and clutching the fan.

Obviously, the invention is not limited to the embodiments described and shown, it is liable to numerous changes in the reach of those skilled in the art, according to the aforegoing applications and without departing from the spirit of the invention.

What is claimed is:

1. In an armoured tank, a hollow body having an intake opening, a tight partition in said body dividing the same into a fighting compartment and an engine compartment, said fighting compartment having an air inlet communicating with the atmosphere surrounding said body and said engine compartment having an air inlet and an air outlet communicating with said atmosphere, an internal combustion engine in said engine compartment, means in said engine compartment effective to induce a circulation of cooling air through said engine compartment, an intake pipe connecting said engine with said intake opening of the hollow body for supplying air to said engine compartment separate from said cooling air, means in said fighting compartment for drawing air through said air inlet thereof separate from said cooling air and separate from the air supplied to said engine, means controllable from said fighting compartment to interrupt said circulation of cooling air, an opening in said partition, a pipe passing tightly through said opening, and a fire extinguisher in said fighting compartment connected to said pipe and operable to deliver a fire extinguishing medium through said pipe into said engine compartment.

2. In an armoured tank, a hollow body having a top wall, a tight transverse partition dividing said body into a fighting compartment and an engine compartment, said fighting compartment having an air intake opening in one of its walls and an air inlet in another of its walls, said intake opening and said air inlet lying at a distance from said partition, and said engine compartment having an air inlet and an air outlet formed each in said top wall of the body, an internal combustion engine in said engine compartment, a first aperture in said transverse partition, an intake pipe passing through said first aperture and connecting said engine to said intake opening of the fighting compartment for supplying air taken exteriorly of said fighting compartment to said engine, a radiator in said engine compartment adjacent said air inlet thereof, a first fan in said engine compartment for drawing air taken exteriorly of said engine compartment through said radiator into the engine compartment and to discharge air through said air outlet thereof at a higher pressure than that of the surrounding atmosphere, air purifying means in said air inlet of the fighting compartment, a second fan in said fighting compartment for drawing air taken exteriorly of said fighting compartment through said air purifying means into said fighting compartment to maintain a substantially constant air pressure therein exceeding ambient pressure, a second aperture in said partition, a pipe passing through said second aperture, a fire extinguisher in said fighting compartment connected to said pipe and operable to deliver a fire extinguishing medium through said pipe into said engine compartment, and means controllable from said fighting compartment effective to prevent forced passage of air through said air inlet and said air outlet of the engine compartment.

3. In a combat vehicle, wall means defining a hollow body and including opposed side and end walls, top and bottom walls and an airtight partition dividing the interior of the body into two compartments comprising a fighting compartment and an engine compartment, an air breathing internal combustion engine in said engine compartment, said engine compartment having an air inlet and an air outlet, first fan means for pressurized circulation of ventilating air into and out of said engine compartment so as to affect the temperature of said engine and said engine compartment, the exterior walls defining said fighting compartment having at least one breathing-air inlet opening therein, second fan means for drawing air into said fighting compartment for pressurizing the interior thereof, said second fan means being controllable independently of said first fan means, said engine having an air intake, one of the walls at a position remote from said engine compartment having at least one air intake opening therein and conduit means leading from said air intake opening directly to the air intake of the engine whereby the ventilating air, breathing air and engine operating air supplies are independent of one another and the latter two air supplies are separately unaffected by any flame conditions that may surround or exist within said engine compartment.

4. In a combat vehicle as claim in claim 3 and the walls defining said fighting compartment having a plurality of air intake openings therein located at spaced positions relatively to said fighting compartment, conduit means for leading air from said openings to the air intake of the engine, normally open closures associated with each of said air intake openings whereby air can flow from the exterior of the vehicle to the air intake of the engine via any of such air intake openings, and consumable means holding said closures normally open whereby responsive to excessive heat adjacent any one of such air intake openings said consumable means are consumed and the respective closure automatically closes its associated air intake opening.

5. In a military combat vehicle, wall means defining a hollow body and including opposed side and end walls, top and bottom walls and an air-tight partition dividing the interior of the body into two compartments comprising a fighting compartment and an engine compartment, an air breathing internal combustion engine in said engine compartment, said engine compartment having an air inlet and an air outlet both located in the top wall of the body, first fan means associated with said air inlet for pressurized circulation of ventilating air into and out of said engine compartment so as to affect the temperature of said engine and said engine compartment, a radiator for said engine located immediately below said air inlet, said fan being located below said radiator whereby the radiator tends to prevent flames entering said engine compartment, the exterior walls defining said fighting compartment having at least one breathing air inlet opening therein, second fan means for drawing air into said fighting compartment for pressurizing the interior thereof, said second fan means being controllable independently of said first fan means, said engine having an air intake, one of the walls at a position remote from said engine compartment having at least one air intake opening therein and conduit means leading from said intake opening directly to the air intake of the engine whereby the ventilating air, breathing air and engine operating air supplies are independent of one another and the latter two air supplies are separately unaffected by any flame conditions that may surround or exist within said second compartment.

References Cited in the file of this patent

UNITED STATES PATENTS

| | | |
|---|---|---|
| 1,660,269 | Knox et al. | Feb. 21, 1928 |
| 1,805,771 | Knox | May 19, 1931 |
| 2,023,569 | Allen et al. | Dec. 10, 1935 |
| 2,464,975 | Gibbs | Mar. 22, 1949 |
| 2,722,986 | Baldine | Nov. 8, 1955 |